Aug. 18, 1936.  G. GASTRICH  2,051,636

SURFACE EXPLORING AND THICKNESS GAUGING DEVICE

Filed March 27, 1933  2 Sheets-Sheet 1

INVENTOR:
Gustav Gastrich,
BY Alfred E. Iselinger
ATTORNEY.

Aug. 18, 1936.    G. GASTRICH    2,051,636
SURFACE EXPLORING AND THICKNESS GAUGING DEVICE
Filed March 27, 1933    2 Sheets-Sheet 2

INVENTOR:
Gustav Gastrich,
BY Alfred E. Tschinger
ATTORNEY.

Patented Aug. 18, 1936

2,051,636

UNITED STATES PATENT OFFICE 2,051,636

SURFACE EXPLORING AND THICKNESS GAUGING DEVICE

Gustav Gastrich, Wyomissing, Pa., assignor to Textile Machine Works, Wyomissing, Pa., a corporation of Pennsylvania Application March 27, 1933, Serial No. 662,926

4 Claims. (33—147)

This invention relates to a device for exploring the surfaces and determining the thickness of materials in sheet, strip or bar form, particularly rolled, pressed and wrought iron, steel, and other metallic products, for which special standards of thickness, surface smoothness, and tolerances have been established, and in which any deviation therefrom will prevent use of the strip or material for the intended purpose.

Devices of the type noted are usually provided with a pair of gauging elements arranged in aligned directly opposed relation to each other for contact with opposite sides or faces respectively of a specimen inserted between the two. In devices of this type one or the other or both of the contact elements is or are operatively connected to a graduated scale or dial and/or a pointer cooperating therewith for indicating the thickness of the portion of a specimen disposed between the elements, within the areas respectively engaged by the contact elements on the opposite faces of the specimen.

The contact elements of calipering gauges of the prior art have heretofore taken the form of metallic pins or plungers having flat specimen-engaging surfaces. In some instances the gauging elements have curved surfaces provided by steel balls fixed in the plungers, or in other suitable carriers. Being of metal, and as a result of constant rubbing action of the gauging elements on and over the surfaces of various specimens, the contact faces of the gauging elements wear rapidly, requiring frequent adjustment and occasional replacement of the contact elements. However, during the intervals between such adjustments, an accumulative error in the reading of the gauge ensues, due to the wearing away of the contact surfaces.

In other instances, with a view to overcoming the above noted wearing away of the contact surfaces of the gauging elements, these elements have taken the form of freely rotatable wheels arranged to roll on and over the opposite faces of the specimen during relative movement between the specimen and the gauge in testing the thickness of the whole or of relatively spaced portions of the specimen.

In those devices employing gauging elements having flat contact surfaces such surfaces are usually of a relatively large area, and in those of the devices employing steel balls or wheels the radii of the curvatures of the contacting surfaces are relatively great. Consequently, in either instance it is impossible to concentrate the gauging of the specimen at relatively minute directly opposed points on the opposite faces of the specimen respectively, due to the fact that the contacting surface of one of the gauging elements will bridge small concavities frequently found in one surface of the specimen while the other of the gauging elements will ride on the top of the ridge or bulge found on the opposite side of the specimen in direct alignment with the concavity of the first said side of the specimen. Thus, the gauge will indicate a thickness of metal in the specimen which in reality does not exist, and consequently inaccurate readings are indicated. Other conditions causing inaccurate readings result from particles of dirt and gummy oil adhering to the surfaces of the specimen.

Among the objects of the invention is to provide gauging elements which will present to the specimens an extremely hard contact surface, such as provided by a polished diamond.

Another object of the invention is to make the contact surfaces of the gauging element nearly pointed and rounding the extreme end of each element just enough to prevent scratching or cutting of the surface of the specimen, with the contacting surface of the element in relief to the surrounding body portion of the element and the carrier in which the element is mounted, to permit the relatively pointed ends of the gauging elements to enter into small concavities in the surfaces of the specimens for accurately measuring the thicknesses of interposed specimens.

Another object of the invention is to provide means whereby foreign matter is removed from the surfaces of the specimen prior to the presentation of the specimen to the contact surfaces of the gauging elements.

Other features of the invention and the construction and operation of the device forming the subject thereof will be more fully disclosed hereinafter, reference being had to the accompanying drawings, in which.

Figure 2:
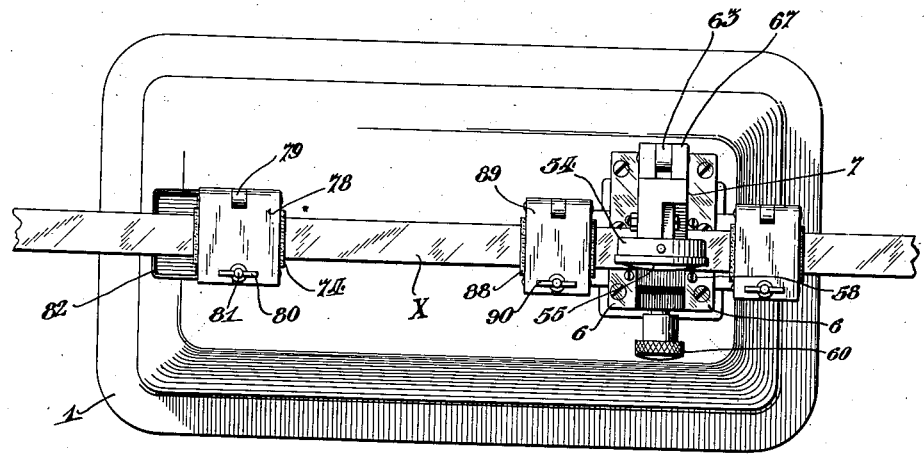
Fig. 2 is a plan view of the device shown in Fig. 1.

The device shown in the drawings comprises a stationary base 1, at one end of which is rigidly secured a pedestal 2. The pedestal 2 is provided with a horizontally disposed stationary head 3 having a slideway 4 formed therein and which extends transversely of the base 1. Slidably mounted in the guideway 4, and maintained therein by fixed plates 6, 6, is a base 5 of a movable bracket or head 7, which latter carries a measurement-indicating device 8 of any desired form.

Figure 1:
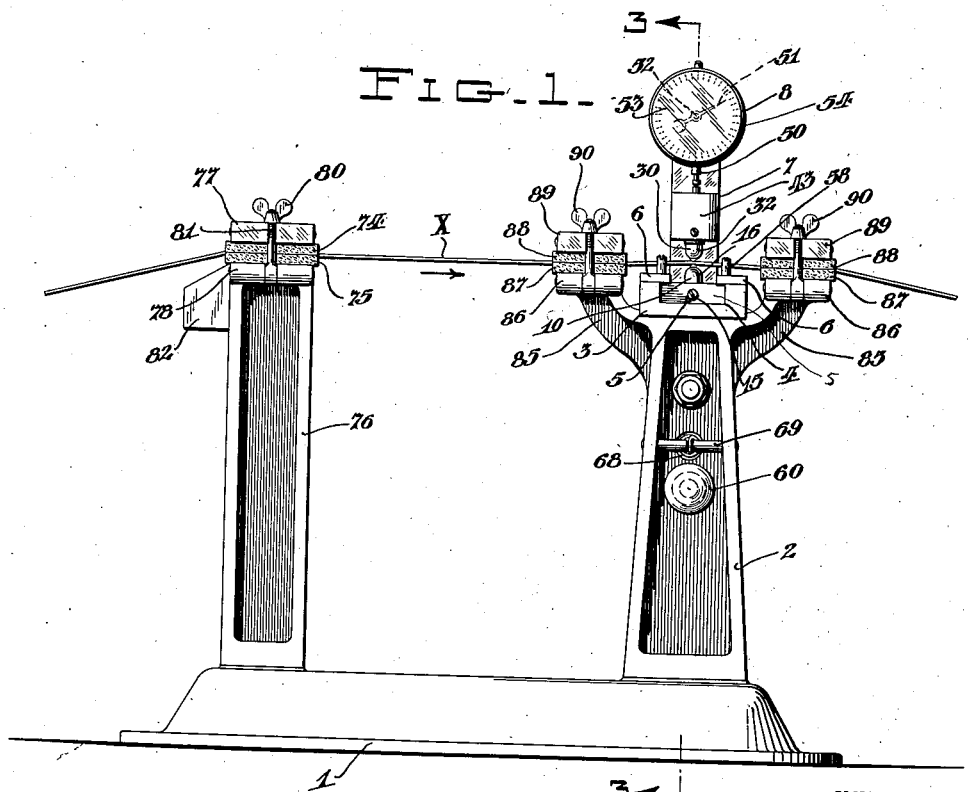
Fig. 1 is a front elevation of a device made in accordance with the principles of the present invention.
Figure 4:
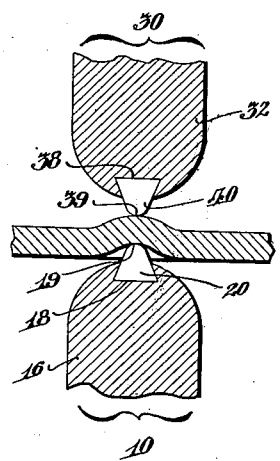
Fig. 4 is an enlarged sectional elevation on the line 4—4, Fig. 3.
Figure 3:
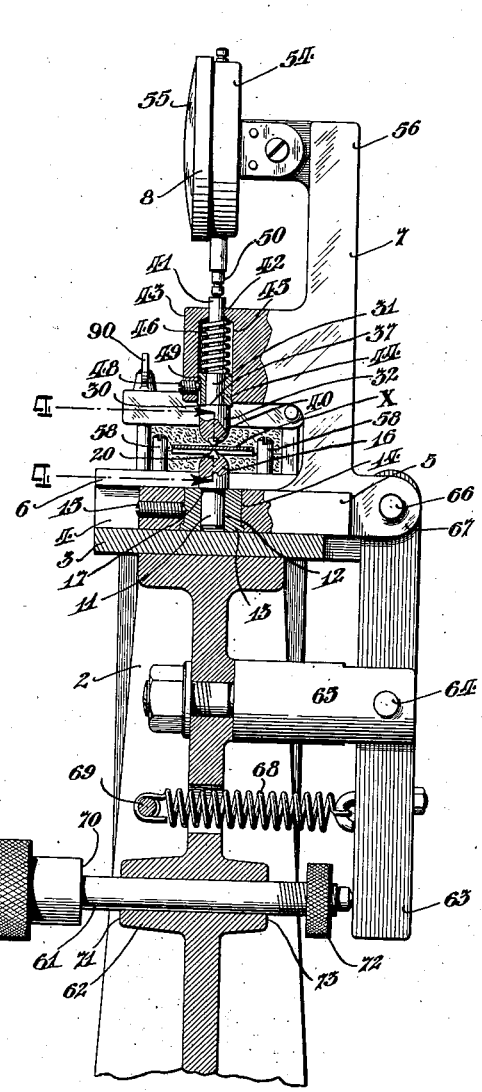
Fig. 3 is a transverse sectional elevation taken on the line 3—3, Fig. 1.

In the slidable base 5 of the head 7 is removably mounted a post 10. The post 10 has a reduced stem 11 which is mounted in the bore 12 of a thimble or sleeve 13. The thimble 13 is mounted in a bore 14 formed in the base 5 and is secured therein by a set screw 15. The upper portion 16 of the post 10 being of relatively larger cross-sectional area than the stem 11 provides a shoulder 17 which is seated on the upper surface of the thimble 13. The upper end of the post 10 is rounded or of semispherical form, as shown in Figs. 1, 3, and 4. Formed in the semispherical surface of the post 10 is a circular cavity 18 in which is fixedly mounted a gauging element 20 in any suitable and well known manner.

The gauging element 20 may be composed of any natural or artificial stone-like substance having the hardness of a natural diamond and preferably is composed of a natural diamond. The gauging element 20 preferably is of either a semispherical or semiovate form, providing a relatively small contacting surface 19. The contact surface 19 is preferably curved on an arc having such an extremely small radius as to provide a substantially minute contact point on the gauging element 20, but large enough to prevent scratching or cutting of the surface of an engaged specimen.

Due to the mounting of the gauging element 20 and its supporting post 10 the said gauging element is fixed insofar as vertical movement and lateral movement in a direction longitudinally of the base 1 is concerned, while lateral movement in a direction transversely of the base 1 is permitted by the slidable mounting of the base 5 of the head 7 within and relative to the head 3 of the pedestal 2.

Mounted in vertical alignment with, and for axial movement with respect to the relatively fixed lower post 10 is a second or upper post 30. The upper post 30 comprises an elongated stem 31 and an enlarged head 32 having a semispherical end similar to the opposed end of the lower post 10. The rounded lower end of the upper post 30 is provided with a cavity or seat 38 for a second gauging element 40 which, like the first mentioned gauging element 20, is composed of diamond or other equally hard stone of semispherical or semiovate form providing a small radius, relatively pointed, contact surface 39.

The upper end 41 of the stem 31 of the upper post 30 is slidably mounted in a bearing 42 formed in a laterally extending projection or boss 43 of the head 7. Mounted on the stem 31, and seated on the shoulder 37 provided by the enlarged head 32 of the post 30, is a ring 44 which is slidably mounted in a counterbore 45 formed in the boss 43 in axial alignment with the bearing 42 in which the upper end 41 of the stem 31 is slidably mounted. Encircling the stem 31 of the post 30, intermediate the base of the counterbore 45 and the upper surface of the ring 44, is a coil spring 46 which tends at all times to press the ring 44 and the post 30 downwardly, to cause the contact surface 39 of the upper gauging element 40 to engage the contact surface 19 of the lower gauging element 20, or the upper surface of a specimen X interposed between the two.

In order to maintain the ring 44 and the spring 46 in said counterbore 45, a pin or screw 48 having a reduced end projecting into a slot 49 formed in the side of the ring 44 is provided.

Mounted on the slide head 7, in axial alignment with the relatively fixed post 10 and the relatively axially movable post 30, and bearing on the extreme upper end of the said post 30, is the stem 50 of the indicator 8. The stem 50 of the indicator 8 may operatively connect, in any manner common to devices of this type, such as by a train of gears and reacting springs (not shown), with a pointer 51, for turning the said pointer about its axis 52 over the circular dial 53 of the indicator 8 upon vertical movement of the stem 50. The dial 53 is suitably calibrated or graduated to indicate the thickness of a specimen X interposed between and engaged on its opposite faces by the relatively movable gauging elements 20 and 40 respectively. The dial 53 is mounted in a suitable casing 54 provided with suitable glass or lens 55 enclosing the dial and the pointer, said casing 54 being secured in any suitable manner to a vertical extension 56 of the slide head 7.

Lateral movement of the specimen X is prevented by guideposts 58, 58 secured to and projecting vertically from the head 3 of the pedestal 2.

Sliding movement of the head 7, and consequently lateral movement of the gauging elements 20 and 40 transversely of the specimen X as the latter is held between the post 58, 58, is accomplished, in the present instance, by means of a handle or knob 60 mounted on one end of a rod 61 which is longitudinally slidably mounted in a bearing 62 formed in the pedestal 2, the opposite end of the rod 61 bearing against a free depending end of a lever 63. The lever 63 is pivotally mounted intermediate its ends, as by a pin 64, in a horizontally extending post 65 secured to the pedestal 2. The opposite end of the lever 63 is pivotally connected at 66 to a lug 67 formed on and projecting rearwardly from the slide head 7.

Secured to the lever 63, intermediate the pivot 64 and the point of contact therewith of the actuating rod 61, is one end of a spring 68. The opposite end of the spring 68 is secured by a pin 69 to the pedestal 2, said spring tending to rock the lever 63 about its pivot 64, and thereby move the head 7 and gauging elements 20 and 40 in one direction transversely of the specimen X. Movement of the head 7 and gauging elements 20 and 40 in the opposite direction is effected by manually pressing the knob 60 of the rod 61 inwardly.

By the above noted sliding movements of the head 7 the gauging elements 20 and 40 are caused to travel across the specimen X for gauging the thickness thereof at various points between the opposite parallel longitudinal edges thereof.

The above noted sliding movement of the head 7 and gauging elements 20 and 40 is limited in one direction to keep the travel of the gauging elements 20 and 40 within the width of the specimen, by the inner surface 70 of the knob 60 engaging the outer end 71 of the bearing 62 and in the opposite direction by a nut 72 adjustably mounted on the rod 61 engaging the rear surface 73 of the bearing 62.

The specimen X is adapted to be moved longitudinally, in the direction of the arrow in Fig. 1, for the purpose of gauging the thickness of the specimen at various points throughout the length thereof.

In order to remove foreign matter adhering to the opposite surfaces of the specimen X from said surfaces, before presentation thereof to the gauging elements 20 and 40 respectively, the said specimen is first passed horizontally between a pair of cleaning elements 74 and 75 which are removably supported on the upper end of a pedestal 76 that is rigidly secured to the stationary base 1 at the opposite end thereof from that occupied by the pedestal 2. The cleaning elements 74 and 75 are respectively carried by and preferably secured to plates 77 and 78, the plate 77 being hinged at 79 to the plate 78 which latter is integral with and constitutes the top of the pedestal 76, the said cleaning elements being tightly pressed against the opposite faces of the specimen X, which passes between said cleaning elements, by means of a butterfly nut 80 threaded on a bolt 81 which is hinged to the plate 78 and extends through a slot formed in the plate 77.

The foreign substance removed from the specimen X by the cleaning elements 74 and 75 drops into a container 82 fastened on or forming a part of the pedestal 76.

In order to maintain the specimen X in proper position to be engaged by the gauging elements 20 and 40 the pedestal 2 is provided with laterally extending brackets 85, 85 which are respectively disposed at opposite sides of the head 3 of the pedestal 2. Each bracket 85 is provided with a top plate 86, similar to the top plate 78 of the pedestal 76. Each top plate 86 supports a pair of cleaning elements 87 and 88 which are respectively disposed adjacent the opposite faces of the specimen X and pressed into contact therewith by a pressure plate 89 hinged to the plate 86 and pressed downwardly, for slidably gripping the specimen X between the cleaning elements 87—88, by butterfly nuts 90, 90 functioning in the same manner as the butterfly nut 80 above referred to.

In order to insure engagement of the lower gauging element 20 with the underside of the specimen X, at all times, the common plane of the openings between the cleaning elements 87 and 88 in the brackets 85, 85, through which the specimen X passes, is lower than the plane of the contact surface 19 of the gauging element 20, whereby the specimen X, in passing from one to the other of the guides afforded by the brackets 85, 85 respectively, is flexed upwardly between the guides 58, 58 by the lower gauging element 20, thus assuring firm contact between the contacting surface 19 of the lower gauging element 20 and the underside of the specimen at all times.

Engagement of the contact surface 39 of the upper gauging element 40 with the upper surface of the element X is effected by the spring 46 pressing the sleeve or ring 44 downwardly against the shoulder 37 of the relatively movable post 30.

The stem 50 of the indicator 8 follows the movements of the post 30 and rotates the pointer 51 into registration with the various graduations on the dial 53 in accordance with the variations in elevation attained between the gauging elements 20 and 40 as the contacting surfaces 19 and 39 thereof engage different portions of the specimen X wherein the thickness of the specimen varies.

Of course, the device specifically shown and described can be changed and modified in various ways without departing from the invention herein disclosed and hereinafter claimed.

I claim:

1. A surface-exploring and thickness-gauging device comprising a base, a pedestal thereon provided to receive a flexible element longitudinally across the top, a support having a horizontal body plate and a vertical head on said top movable transversely of the path of the strip, a lever pivoted to the support and depending therefrom, a member secured to the pedestal below the top and to which the lever is also pivoted, a spring connecting the lever and the pedestal, a lever-operating handle in a bearing on the pedestal and having limited movement therein in both directions, a first post having a portion in the body plate and a hemispherical upper end carrying a round-point diamond protruding upwardly therefrom, means on the body for guiding the strip, devices spaced oppositely from the pedestal along said path cooperating with each other to clamp the strip in a plane below said diamond point, said head having a vertical bore above the first post, a second post having a portion in the bore, an upper end above the bore, and a hemispherical lower end carrying a round-point diamond protruding downwardly therefrom, means including a spring in the bore biasing the second stem toward a limited lower position, and an instrument on the head including a lower operating member for engaging said upper end.

2. A surface-exploring and thickness gauging device comprising a stationary base, laterally-spaced first and second pedestals on the base, cleaning elements at the upper end of the first pedestal, a device for clamping the elements against a flexible strip for movement longitudinally over the upper ends of the pedestals, a support having a body and a head at the upper end of the second pedestal movable transversely of the path of the strip, a lever pivoted to the support and depending therefrom, a member on the pedestal below its top to which the lever is pivoted, a spring connecting the lever and the second pedestal, a lever-operating handle on the second pedestal, a first post having a portion in the body and a hemispherical upper end carrying a round-point diamond protruding upwardly therefrom, means on the body for guiding the strip, devices spaced oppositely from the second pedestal along said paths and cooperating with each other to clamp the strip in a plane below said diamond point, said head having a vertical bore above the first post, a second post having a portion in, and an upper end, above the bore and a hemispherical lower end carrying a round-point diamond protruding downwardly therefrom, means including a spring in the bore biasing the second stem toward a limited lower position, and an instrument on the head including a lower operating member for engaging said upper end.

3. A device for detecting minute surface irregularities of a hard surfaced article comprising a jeweled point secured against perpendicular movement relative to a plane containing one surface of the article, a similar jeweled point perpendicularly movable toward and from a plane containing an opposed surface of the article, both of said points being mounted in a common supporting structure movable transversely of said article, said points having a surface contact portion of such dimension as to register with minute surface irregularities and blunt enough to prevent abrasion of said surface, means maintaining one surface of said article in constant engagement with said first mentioned jeweled point, resilient means urging said supporting structure in one direction and slidable means for manually shifting said supporting structure in the opposite direction, and means for indicating the magnitude of movement of said movable point due to the irregularities of both said surfaces as the article passes through said device.

4. A device for detecting minute surface irregularities of a hard surfaced article comprising a jeweled point secured against perpendicular movement relative to a plane containing one surface of the article, a similar jeweled point perpendicularly movable toward and from a plane containing an opposed surface of the article, said points being in directly opposed aligned relation and mounted in a common supporting structure movably transversely of said article, said points having surface contact portions of such dimension as to register with minute surface irregularities and blunt enough to prevent abrasion of the surfaces of said article, means maintaining one surface of said article in constant engagement with said first mentioned jeweled point, resilient means urging said supporting structure in one direction and slidable means for manually shifting said supporting structure in the opposite direction, and means for indicating the magnitude of movement of said movable point due to the irregularities at points directly opposite each other on both said surfaces as the article passes through said device.

GUSTAV GASTRICH.